(12) United States Patent
Muller et al.

(10) Patent No.: US 8,240,588 B2
(45) Date of Patent: Aug. 14, 2012

(54) STAR FEEDER WITH COMMINUTING INSERT

(75) Inventors: Robert Muller, Daisendorf (DE); Klaus Bucher, Wolpertswende (DE); Franz-Josef Vogelsang, Ravensburg (DE)

(73) Assignee: Zeppelin Systems GmbH, Friedrichshafen (DE)

( * ) Notice: Subject to any disclaimer, the term of this patent is extended or adjusted under 35 U.S.C. 154(b) by 229 days.

(21) Appl. No.: 12/586,575

(22) Filed: Sep. 24, 2009

(65) Prior Publication Data

US 2010/0078511 A1 Apr. 1, 2010

(30) Foreign Application Priority Data

Sep. 29, 2008 (DE) .................. 10 2008 049 356

(51) Int. Cl.
   *B02C 25/00* (2006.01)

(52) U.S. Cl. .................. 241/242; 241/224; 241/225

(58) Field of Classification Search .................. 241/224, 241/225, 242
   See application file for complete search history.

(56) References Cited

U.S. PATENT DOCUMENTS

| | | | |
|---|---|---|---|
| 5,417,374 A * | 5/1995 | Kranz et al. | 241/18 |
| 5,547,136 A * | 8/1996 | Steffens et al. | 241/73 |
| 6,032,884 A * | 3/2000 | Bowling et al. | 241/28 |
| 7,377,201 B2 * | 5/2008 | Chen | 83/500 |
| 7,891,592 B2 * | 2/2011 | Yamamoto et al. | 241/101.74 |

* cited by examiner

*Primary Examiner* — Faye Francis
(74) *Attorney, Agent, or Firm* — Cooper & Dunham LLP (57) ABSTRACT

A star feeder for conveying all types of bulk materials having a comminuting insert for crushing bulk material agglomerates (29). Bulk material agglomerates are conveyed into the inlet of the star feeder (1) and there pass through the comminuting insert (10), which comprises at least one shearing wall (20), which includes at least two mutually angled shearing surfaces (21, 22), which widen upward, toward the inlet direction (11) and meet centrally in the region of at least one feed edge (23).

10 Claims, 7 Drawing Sheets

STAR FEEDER WITH COMMINUTING INSERT

FIELD OF THE INVENTION

The subject of the invention is a star feeder including a comminuting insert for crushing all types of bulk material agglomerates.

BACKGROUND OF THE INVENTION

One shortcoming of conventional star feeders is that large-volume agglomerates that are fed in at the inlet connection cannot be introduced into the star wheel chamber because of their volume. The prior art therefore provides star feeders having so-called shredding inserts, which are generally installed in the inlet connection on the inlet side of the star wheel housing.

The agglomerates fed into the star feeder are pressed by the motion of the star wheel into the cutting blade or cutting inserts which are disposed in the inlet connection and are thereby comminuted.

A drawback of these known comminution methods is, however, that with increasing operating time, particularly in the use of detachable cutting inserts, the fastening thereof works loose and has to be readjusted. In an extreme case, the fastening may come loose during operation and the cutting blade may fall into the star wheel chamber, resulting in the destruction of the star feeder.

In the case of some known cutting inserts, the cutting edges wear down, whereby metal particles are undesirably carried into the comminuted material and these cutting inserts must from time to time be replaced.

SUMMARY OF THE INVENTION

The object of the invention is therefore to improve upon a star feeder with comminuting insert of the type stated in the introduction such that wear-exposed cutting edges or the like are avoided and a longer operating time with operationally reliable working method is obtained.

For the achievement of the defined object, the invention is characterized by the inclusion of a comminuting insert having static shearing walls as set forth below.

A fundamental feature of the invention is that, in the inlet region of the star feeder, there is disposed a comminuting insert. This comminuting insert is configured such that a shearing wall, which forms at least two mutually angled shearing surfaces, provides an opposing surface to a rotary star wheel. The two mutually angled shearing surfaces end in two mutually angled shearing edges, and meet in a central region, forming a longitudinal contour. This longitudinal contour extends upward in the feed-in direction of the star feeder inlet.

According to the invention, the contour can be configured as a straight or curved edge. The contour can also, however, be configured with little definition as a rounded transition between two shearing surfaces. According to the invention, the shearing surfaces can be plane surfaces, curved surfaces or 3-dimensionally shaped surfaces, for example corrugated surfaces.

A fundamental feature of the present invention is that cutting inserts and wear-exposed cutting edges are dispensed with and that a fixed shearing wall, which directly forms an integral component of the feed-in connection, is integrated into the comminuting insert at the inlet of the star feeder. Thus the advantage exists that no detachable and wear-exposed cutting inserts are present, and consequently, operationally vulnerable fastenings are also absent.

It can here be provided that the shearing wall is formed of reinforced material placed inside of the inlet surfaces of the comminuting insert, and this reinforced material is particularly wear-resistant.

However, the shearing wall may also be formed as an integral part of the housing wall of the comminuting insert.

The shearing wall according to the invention, with the shearing surfaces which are disposed there, is thus an integral housing component of the exchangeable comminuting insert.

The star feeder according to the invention differs substantially from similar devices according to the prior art through the use of a roughly cylindrical comminuting insert. The comminuting insert is inserted flush into the housing inlet. Its bottom contour is matched to the star wheel. The comminuting insert is removable. Due to the design, a readjustment or exchange of static blades is unnecessary. Damage to the star feeder due to a loosening of the screws on a cutting device, is thus precluded. Inside the star feeder there are no detachable parts present. As a result of the integral construction of the comminuting insert, an extremely long operation time is possible. The comminuting insert boasts a special geometric shape, which allows an ideal cutting process. The cutting (or crushing or breaking) of the agglomerates is possible in both rotational directions of the star wheel. All structural parts which are placed under load have been checked by means of FEM calculation with respect to the maximally permitted torque. Furthermore, the drive unit and the star wheel have been correspondingly strengthened.

The invention is not limited to the fact that the shearing wall in the comminuting insert consists of just two shearing surfaces, which stand at an angle to each other and meet or merge centrally in a contour beveled to the vertical.

In one embodiment of the present invention, it is provided that, instead of two such shearing surfaces, a multiplicity of further shearing surfaces are present, which are disposed, so to speak, lying prismatically one beside the other, and that respectively two mutually adjacent prismatic surfaces meet or merge in a contour, so that there are a plurality of contours, combined with a plurality of meeting shearing surfaces.

Hence it is important in the current invention that the longitudinal extent of the contour at which the shearing surfaces meet extends into the inlet region of the star wheel such that the shearing surfaces widen in an upward direction. Accordingly, the inner surfaces of the comminuting insert act as a feed hopper.

It is additionally important that said shearing wall is located in the region of a bottom surface of the comminuting insert, this bottom surface reducing the inlet cross section of the feed hopper of the star feeder. The advantage thus exists that the cutting edges for the shearing wall can be disposed in the region of this bottom surface, whereby an improved sealing surface against agglomerate leakage losses is ensured.

The shearing edges or shearing contours of the shearing wall are angled toward the inlet region of the star feeder. Thus a bottom surface of enlarged area, which forms a sealing surface for protection against leakage losses upon passage of the star wheel web, is formed at the base of the cylindrical comminuting insert's side wall. The term shearing edge should not be interpreted restrictively as a sharp edge, but rather, according to the invention, includes straight or curved running contours, as well as connecting contours of mutually merging surfaces.

Hence it is important in the present invention that the large-volume agglomerates, which, due to their size, protrude from the star wheel chamber, are forced by the passing star wheel web against the shearing surfaces disposed at an angle to one another and are centered there particularly with respect to the contour joining the two shearing surfaces.

Since this contour forms an angle in the inlet direction, the agglomerate to be comminuted is directed by the two shearing surfaces in the direction of the middle contour, is crushed there against the wall, and the remnants are diverted upward in the opposite direction to the feed-in direction and fall into the succeeding star wheel chamber.

In principle, a crusher action therefore takes place rather than a cutting action, as was known in the prior art.

As a result of this crusher action acting on the agglomerates to be comminuted, large surface areas in the region of the shearing wall are in use, which is associated with the advantage that only a small amount of wear is incurred there, the abrasion of metallic chips cannot normally take place and there are no detachable parts in this region.

Depending on the size of the agglomerate, this process can also be multiply repeated, to be precise until such time as the agglomerate is broken into such small pieces that it can be taken up by the following star wheel chamber.

All data and features disclosed in the documentation, inclusive of the abstract, particularly the spatial configuration represented in the drawings, are claimed as fundamental to the invention, insofar as, individually or in combination, they are novel relative to the prior art.

BRIEF DESCRIPTION OF THE DRAWINGS

The invention is explained in greater detail below with reference to drawings representing just one embodiment. Further features and advantages of the invention here emerge from the drawings and their description, wherein.

DETAILED DESCRIPTION OF THE PREFERRED EMBODIMENTS

Figure 1:
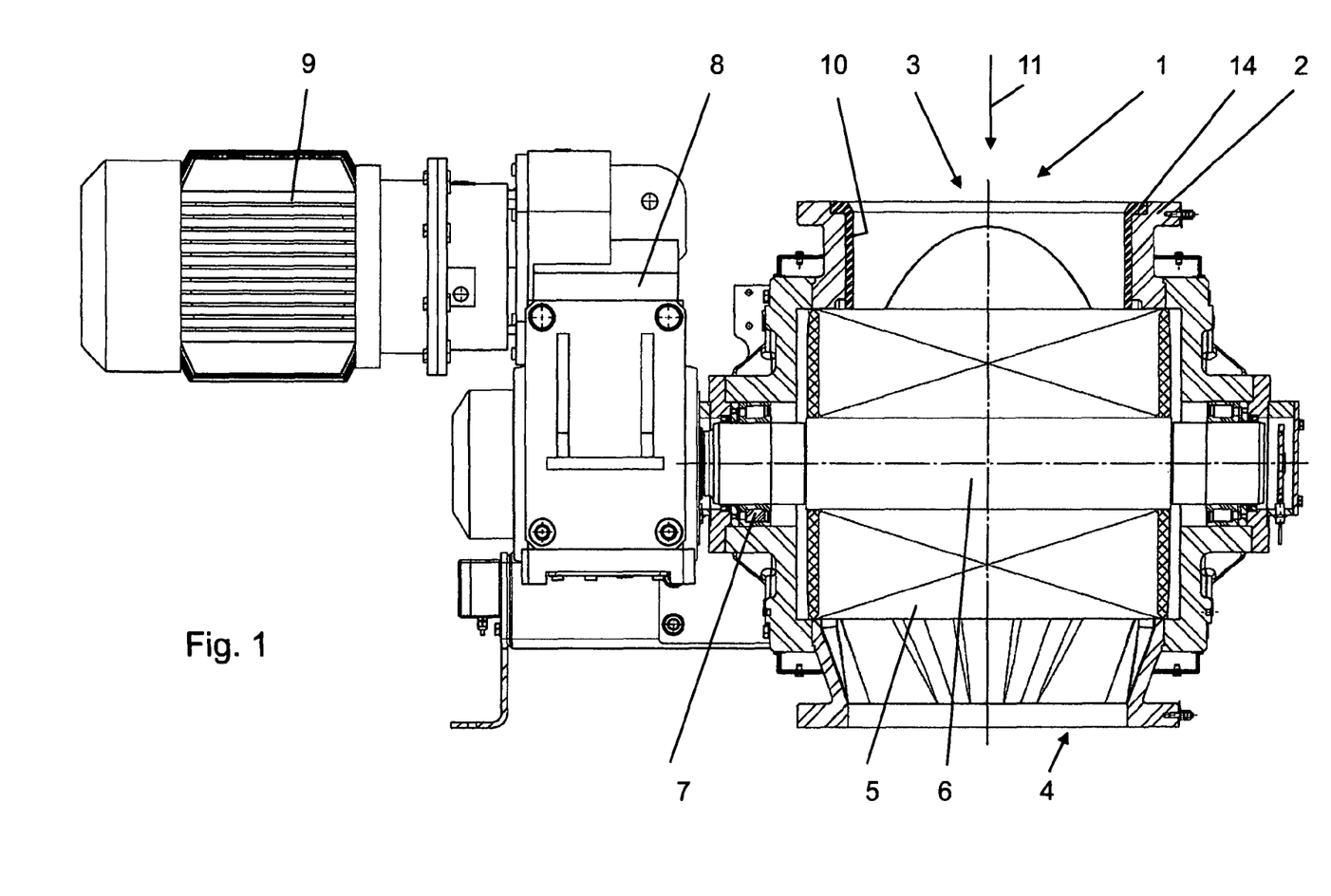
FIG. 1: shows a side view of a star feeder according to the invention with a comminuting insert.
Figure 2:
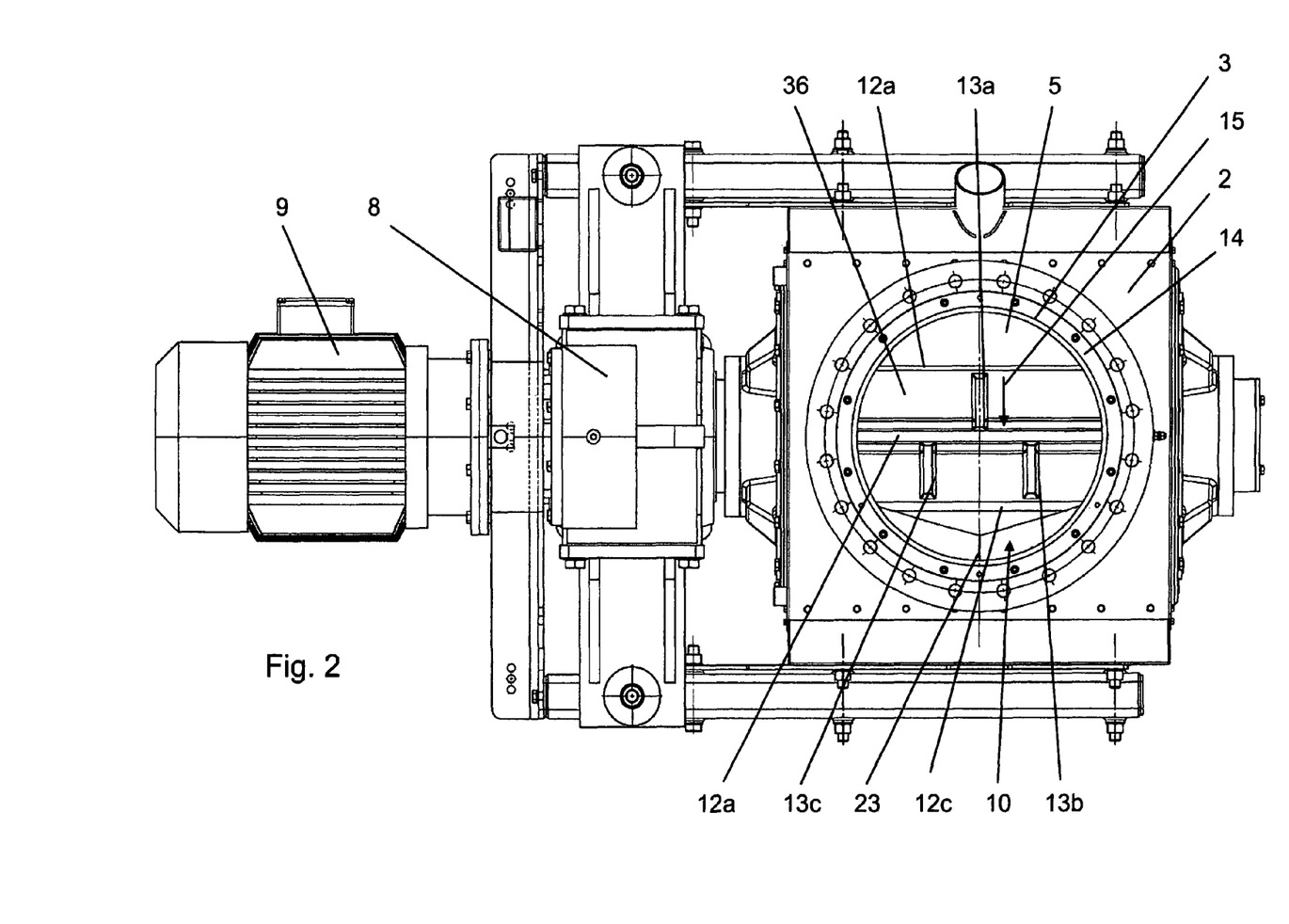
FIG. 2: shows a top view of the star feeder according to FIG. 1, FIG. 3: shows a perspective representation of the comminuting insert in rotated representation.

In FIGS. 1 and 2, a star feeder 1 of known construction is shown in general representation, the star feeder essentially consists of a metallic housing 2, on the top side of which there is provided an inlet 3 for the feed-in of the bulk material in the arrow direction 11 and on the bottom side of which there is an outlet 4 for the crushed bulk material.

In the housing 2 of the star feeder, a rotary star wheel shaft 6 is received by roller bearings 7, the star wheel shaft 6 being connected in a rotationally secure manner to a star wheel 5.

The star wheel 5 forms a multiplicity of evenly distributed star wheel chambers, each star wheel chamber being divided off from the adjacent star wheel chamber by a star wheel web 12, 12a, 12b, 12c.

The rotary drive for the star wheel shaft 6 is realized via a flat gear 8, which is driven by a drive motor 9.

The torque of the drive motor 9 must be chosen such that a high torque can be exerted on the star wheel 5 in order to apply the aforementioned crusher action to the bulk material agglomerates 29 running in the inlet direction (arrow direction 11) into a comminuting insert 10 in the arrow direction 11. In FIG. 2, the star wheel webs 12a, 12b, 12c are respectively supported one against the other by stiffening ribs 13.

According to FIGS. 3 to 9, the comminuting insert 10 consists of a roughly cylindrical body, which forms an upper flange ring 14. The comminuting insert 10 is therefore screwed with the flange ring 14 and associated screws onto the inlet region of the star feeder 1. It is hence removable, but fastened securely after insertion into the star feeder.

According to FIGS. 3 to 9, the comminuting insert 10 has a circumferential, closed cylinder side wall 16, which forms on the bottom side a circumferential edge 17. This circumferential edge 17 is brushed past in the rotational direction 15 by the respective star wheel web 12.

According to the invention, a shearing wall 20 is present in the comminuting insert 10. The shearing wall consists of two mutually angled shearing surfaces 21, 22. Each shearing surface 21, 22 is preferably curved. The invention is not, however, limited thereto. It can also be provided that the respective shearing surface 21, 22 is configured with an exactly straight surface, the two shearing surfaces 21, 22 meeting centrally in a contour, hereinafter denoted as the feed edge 23.

In order to arrange these shearing surfaces 21, 22 such that they are angled toward the feed-in direction (arrow direction 11), the bottom edges of the surfaces 21, 22 are disposed in the region of bottom surfaces 18, 19 on the bottom side of the comminuting insert 10.

A larger bottom surface 19 is therefore present, which reduces the clear width of the inlet region and in the region of the shearing edges 24, 25 as the lower limit of the respective shearing surfaces 21, 22.

A smaller bottom surface 19 is also present, which is configured at an angle to the larger bottom surface 18. By virtue of the fact that the shearing edges 24, 25 are disposed in the region of a larger bottom surface 18, the bottom surface abuts the outer diameter 27 of the star wheel and a large-area sealing surface is obtained there, which helps prevent leakage losses. Agglomerate leakage losses are thereby minimized.

Figure 4:
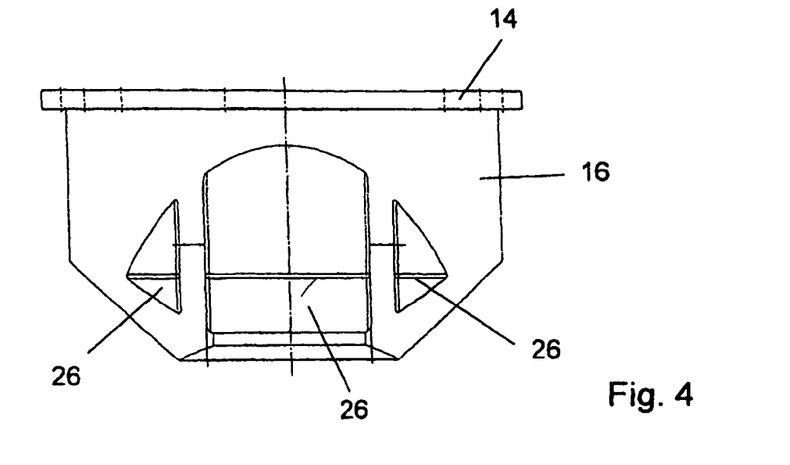
FIG. 4: shows a side view of the comminuting insert from one side.
Figure 5:
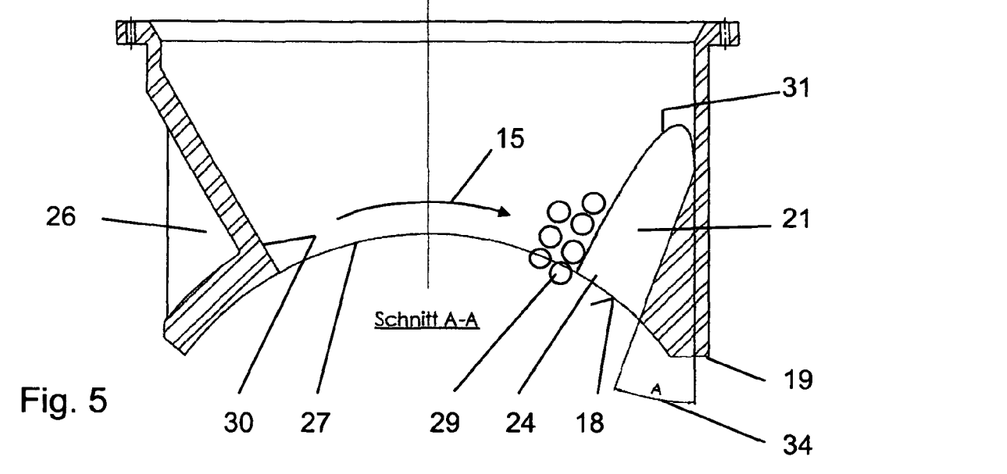
FIG. 5: shows a section through the comminuting insert along the line A-A in FIG. 6, FIG. 6: shows a top view of the comminuting insert in the inlet direction.
Figure 6:
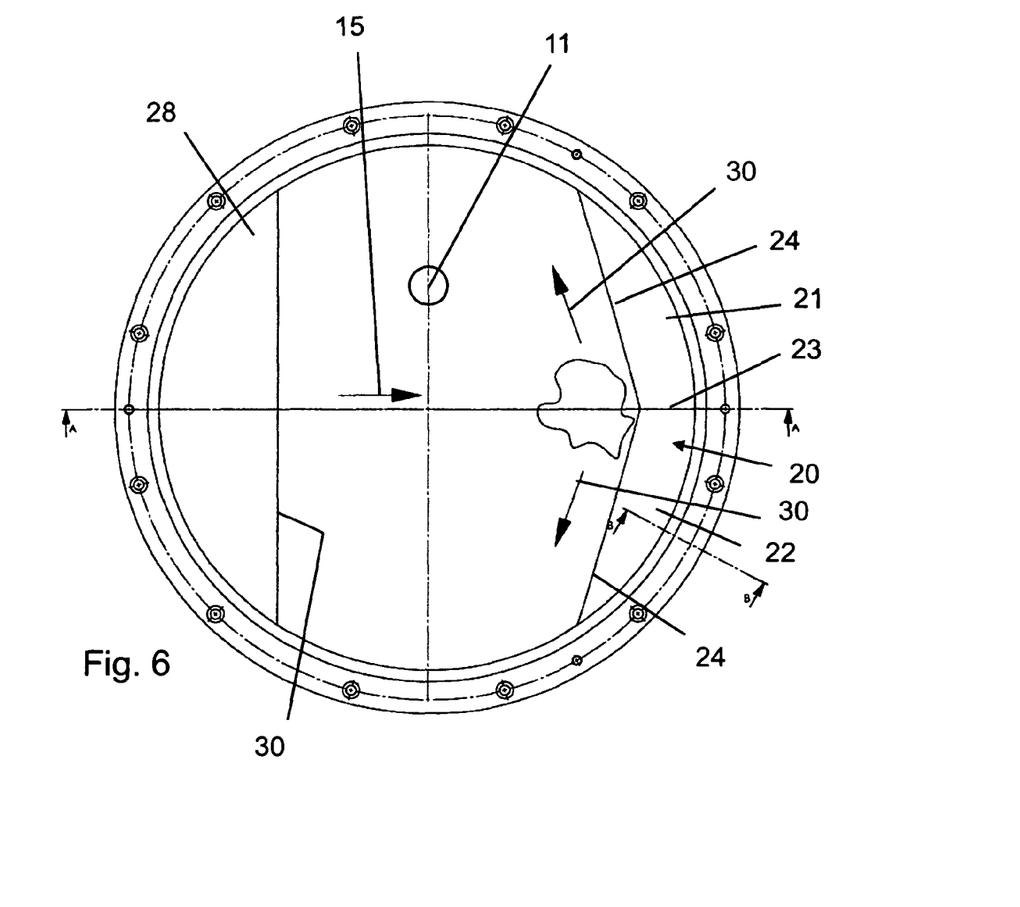
Figure 7:
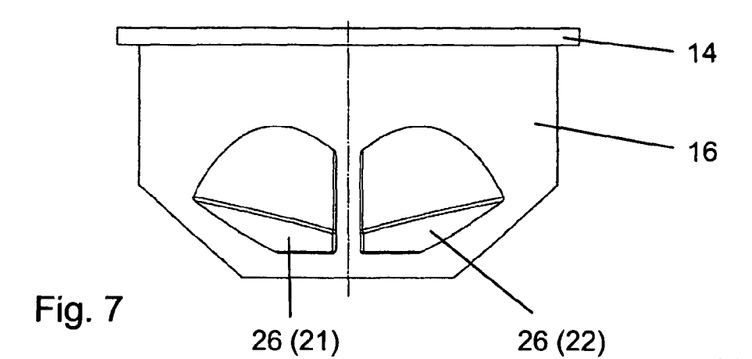
FIG. 7: shows a 180°-rotated side view of the comminuting insert in comparison to FIG. 4, FIG. 8: shows a section along the line B-B in FIG. 6, FIG. 9: shows an isometric view of the comminuting insert in a positionally correct representation.
Figure 8:
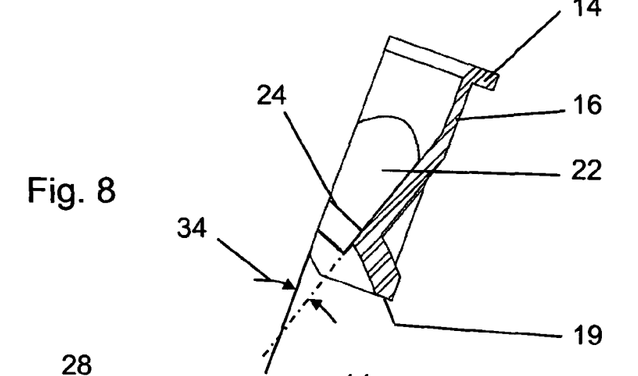
Figure 9:
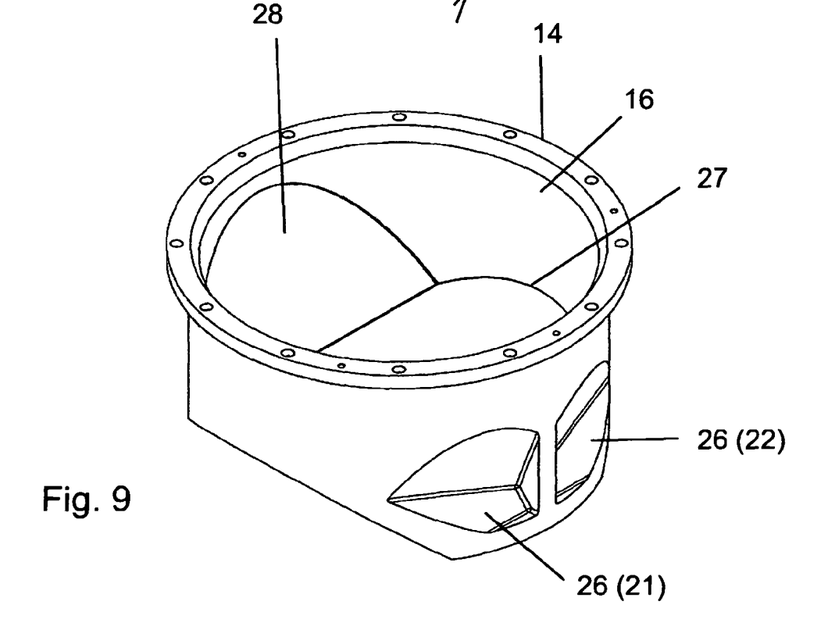

Since the comminuting insert 10 preferably consists of a cast-iron material, it is preferred that, for weight-saving reasons, a multiplicity of cutouts 26 are provided in the cylinder body, as is represented in FIGS. 4 and 7.

These cutouts 26 form no functional impairment since they breach only the cylinder casing, but are closed off to the fore (on the inlet side) by corresponding opposing surfaces. This applies, in particular, to the cone wall 28 lying opposite the shearing wall 20 in the running direction 15, which cone wall is also part of the comminuting insert 10.

Such a cone wall 28, which is directed inward, has the advantage that when the star wheel 5 is driven in the opposite direction to the rotational direction 15, a crusher action takes place also in the region of this cone wall 28.

It is important that the longitudinal extent of the feed edge 23 forms an edge angle 34 which is inclined by roughly 20° toward the vertical.

This means that the feed edge 23 extends in a widening manner outward from the central contour where the shearing surfaces meet.

The same applies to the shearing surfaces 21, 22, which likewise widen outward in the opposite direction of the arrow direction 11.

The shearing surfaces 21, 22 thus form, in conjunction with the feed edge 23, a funnel-shaped inlet surface.

The cone wall 28 has an inlet edge 30, the longitudinal extent of which likewise widens toward the center of the inlet from the side wall of the comminuting insert.

Figure 3:
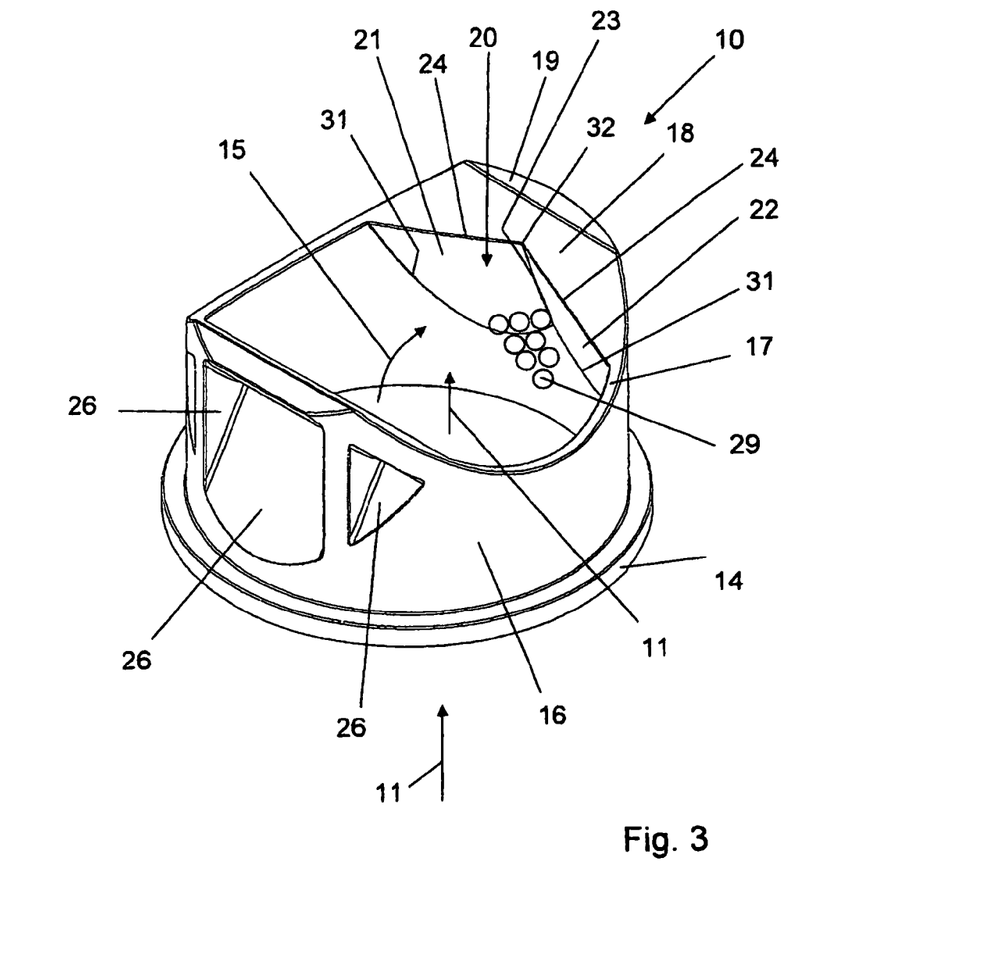

Since the two shearing surfaces 21, 22 are configured as angled surfaces inside a circumferential cylinder casing, in the upper end region thereof, an arc-shaped surface contour 31 is formed, as can be seen from FIG. 3.

The feed edge 23 converges on the bottom side at a junction point 32, and the crusher action on the bulk material agglomerates to be comminuted is now explained in greater detail with reference to FIGS. 10 and 11.

Figure 10:
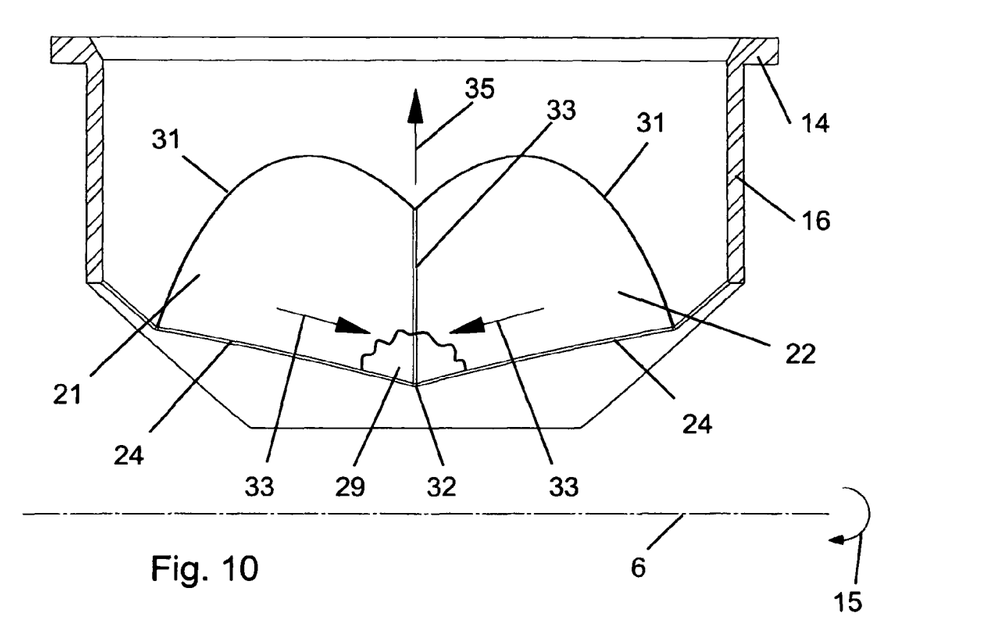
FIG. 10: shows a schematically drawn inner view of the shearing wall with representation of the crusher action on an agglomerate.
Figure 11:
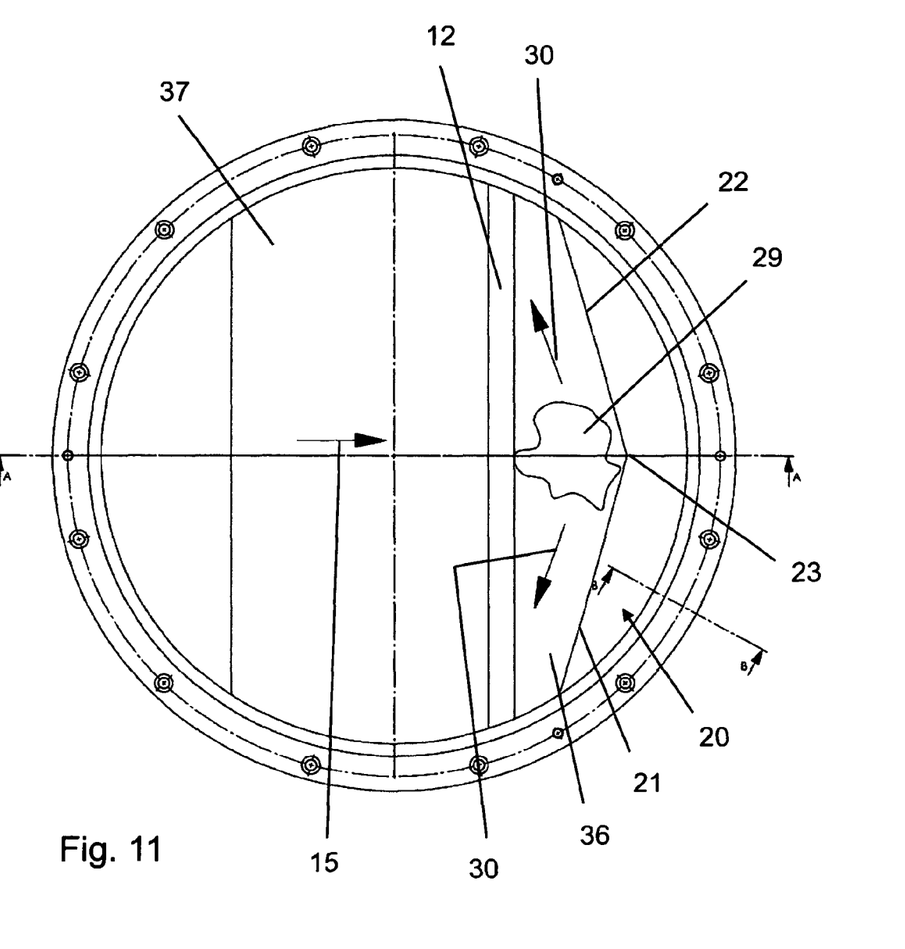
FIG. 11: shows a top view of the arrangement according to FIG. 10.

FIG. 10 is an inner view of the shearing wall 20 according to the invention, with the two mutually angled shearing surfaces 21, 22. It is now apparent that, when the bulk material agglomerate 29 is conveyed in the rotational direction 15 of the star wheel web 12, the bulk material agglomerate 29 is pressed against the two shearing surfaces 21, 22 in the paper plane of FIG. 10 and impinges there into the region of the angularly constructed feed edge 23. The bulk material agglomerate 29 is thus broken against the feed edge 23.

The arrow direction 33 illustrates that all bulk material agglomerates 29 are directed in the arrow direction 33 upon this central feed edge 23 due to the angular setting of the two shearing surfaces 21, 22, and are there broken up.

Crushed parts of the bulk material agglomerate 29 that do not initially fall into a star chamber of the star wheel are diverted in the arrow direction 35 upward along the feed edge 23, and then fall into a succeeding star wheel chamber. Other crushed parts of the comminuted bulk material agglomerate 29 are intially received, however, into the star wheel chamber as is represented in FIG. 11. FIG. 11 shows that a part of the bulk material agglomerate 29 falls into the star wheel chamber 36, while the remaining part of the broken agglomerate falls into the following star wheel chamber 37. This is by virtue of the fact that one part is firstly diverted upward in the arrow direction 35 and then falls over the star wheel web 12 into the following star wheel chamber 37.

The above-stated description reveals that a superior crusher action for the bulk material agglomerate 29 to be comminuted is obtained, without the need to use cutting edges, shredding blades or barb-like projections or the like. It is therefore more a case of a crusher action on the bulk material agglomerate than a cutting action.

KEY TO THE DRAWINGS 1. star feeder
2. housing
3. inlet
4. outlet
5. star wheel
6. star wheel shaft
7. roller bearing
8. flat gear
9. drive motor
10. comminuting insert
11. arrow direction
12. star wheel web a, b, c
13. stiffening rib
14. flange ring
15. rotational direction
16. cylinder wall
17. circumferential edge
18. bottom surface (large)
19. bottom surface (small)
20. shearing wall
21. shearing surface
22. shearing surface
23. feed edge
24. shearing edge
25. shearing edge
26. cutout
27. star wheel diameter
28. cone wall
29. bulk material agglomerate
30. inlet edge (left)
31. surface contour
32. junction points
33. arrow direction
34. edge angle
35. arrow direction
36. star wheel chamber
37. star wheel chamber

The invention claimed is:

1. A star feeder for crushing bulk material agglomerates comprising
    a rotary star wheel and a removable comminuting insert,
        the comminuting insert having a side wall formed as a substantially cylindrical shell, and having at least one shearing wall positioned at an inside surface of the side wall,
        wherein the at least one shearing wall comprises at least two adjoining and mutually angled shearing surfaces, each extending at an acute angle from the side wall, and
        wherein the at least one shearing wall further comprises a bottom surface abutting the sidewall, such that a shearing edge is formed where a shearing surface meets the bottom surface, and
        whereby the crushing of bulk material agglomerates occurs between a surface of the rotary star wheel and a surface of the comminuting insert.

2. The star feeder as claimed in claim 1, wherein the at least one shearing wall is an integral component of the comminuting insert.

3. The star feeder as claimed in claim 1, further comprising a housing and an inlet,
    wherein the comminuting insert is positioned by flush insertion into the inlet, and
    wherein the comminuting insert is removable.

4. The star feeder as claimed in claim 3, wherein the comminuting insert, reduces the cross-sectional area of the star feeder inlet.

5. The star feeder as claimed in claim 1, further comprising a drive motor coupled to a rotary star wheel shaft that is configured to actuate the rotary star wheel,
    wherein the rotary star wheel comprises a plurality of evenly distributed star wheel chambers interspersed with a plurality of star wheel webs,
    the comminuting insert further comprising an angled side wall portion located in a diametrically opposed position relative to the shearing wall, wherein the rotary star wheel is disposed below the comminuting insert and abutting the comminuting insert, such that upon actuation of the rotary star wheel by the drive motor in either rotational direction, agglomerates passing through the comminuting insert are crushed between the rotary star wheel and either one of the angled side wall portion or the shearing surface.

6. The star feeder as claimed in claim 5, wherein the shearing wall and angled side wall portion are disposed in the region abutting the outer circumference of the rotary star wheel, such that agglomerates may only pass through the star feeder by fitting into star wheel chamber of the rotary star wheel.

7. The star feeder as claimed in claim 1, wherein the shearing wall comprises at least three adjacent and mutually angled shearing surfaces, thereby providing at least three corresponding shearing edges.

8. The star feeder as claimed in claim 1, wherein the shearing surfaces are curved.

9. The star feeder as claimed in claim 1, wherein the shearing surfaces are flat.

10. The star feeder as claimed in claim 1, wherein said acute angle inclines the shearing surface approximately 20° from the sidewall.

* * * * *